G. DAVIDSON.
Sextant.
No. 54,698.
Patented May 15, 1866.
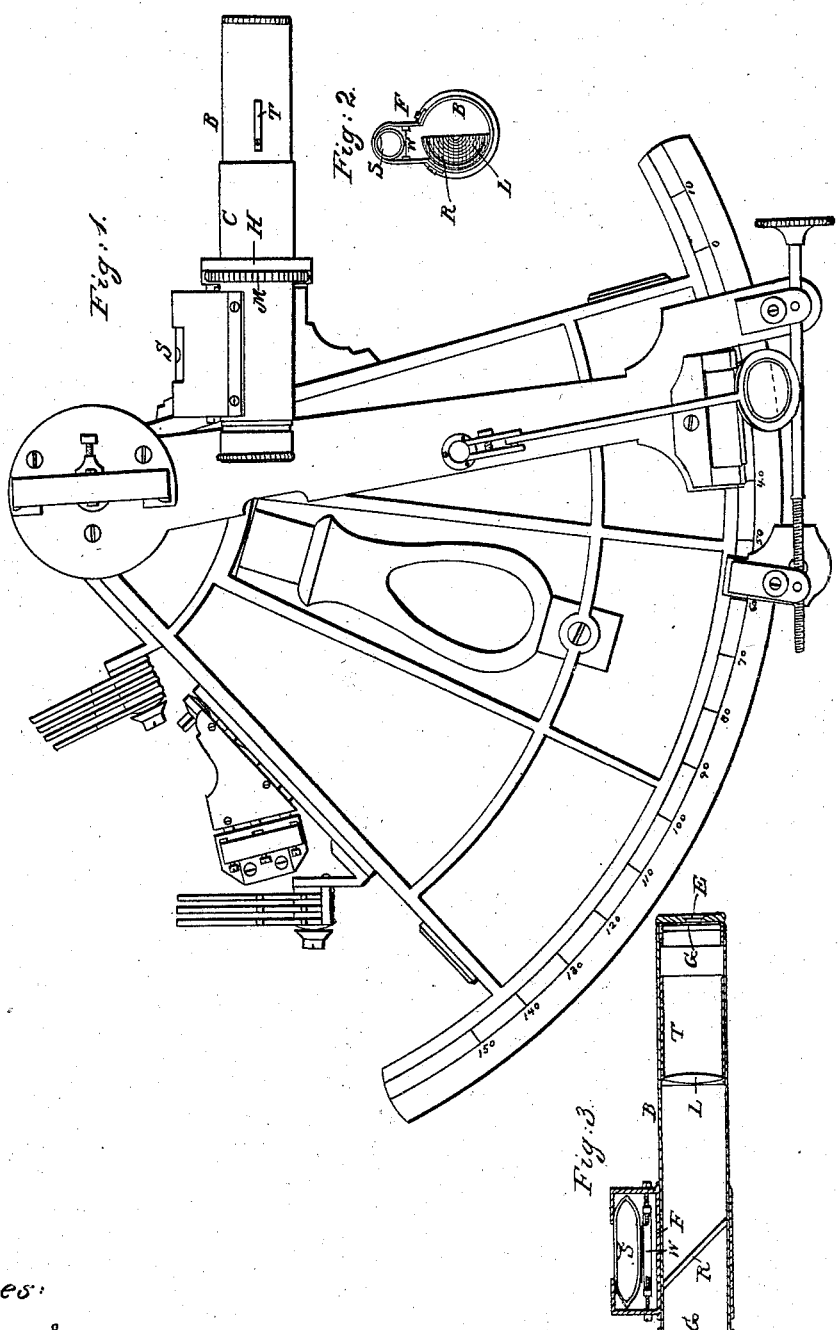

UNITED STATES PATENT OFFICE.

GEORGE DAVIDSON, OF PHILADELPHIA, PENNSYLVANIA.

IMPROVEMENT IN SEXTANTS.

Specification forming part of Letters Patent No. 54,698, dated May 15, 1866.

*To all whom it may concern:*

Be it known that I, GEORGE DAVIDSON, now of the United States Coast Survey, and at present residing in the city of Philadelphia and State of Pennsylvania, have invented a new and useful Improvement in the Construction of Astronomical Instruments; and I do hereby declare the following to be a full and exact description of the same, reference being had to the annexed drawings, of which—

Figure I represents a front view of a sextant, with a side view of a spirit-level, hereinafter described, attached. Fig. II represents an end view of the spirit-level when detached. Fig. III represents a vertical longitudinal section of the same.

Heretofore in ascertaining the altitude of any celestial or terrestrial object by means of the sextant, quadrant, octant, reflecting-circle, or their equivalents, it has been necessary to have the sea horizon visible to the observer, or to use the surface of a liquid or its equivalent as an artificial horizon, as is well known; and on land it has been impossible to measure the depression or small angle of any object by means of the sextant, quadrant, octant, reflecting-circle, or their equivalents with the artificial horizon; and it has been almost impracticable to obtain, by the same appliances, the altitude of any object having a greater angle of elevation than seventy degrees or thereabout.

My improvement enables the observer to measure the altitude or depression of any object at sea, either by day or by night, when the sea horizon is not visible, and on land the altitude or depression of any object may be measured when the sea horizon is not visible or an artificial horizon not procurable or available.

My improvement consists in attaching to the telescope-holder or sight-vane of a sextant, quadrant, octant, reflecting-circle, or their equivalents a small spirit-level with a reflector and adjustable cross-wire for determining the horizontal plane, and with a segment of a double-convex lens for transmitting the images of the cross-line and bubble of the spirit-level in a proper condition for distinct vision, or of the equivalent of these means. This spirit-level consists of a tube, B, closed at each end, with plane glasses G G, the half of the tube nearer the face of the sextant or its equivalent being unoccupied from end to end to permit vision directly through to any object, and the other half of the tube being occupied by the reflector R, having its reflecting-surface toward the observer and placed at a proper angle with the axis of the tube, and also with the half or segment of a double-convex lens, L, secured in the inner tube, T, capable of adjustment for difference of vision. On top of the tube B, over an opening above the reflector, is secured a small spirit-level, S, in the direction of the tube, with an adjustable frame, F, immediately beneath the level, and carrying a fine wire, W, at right angles to the axis of the tube and parallel to the horizontal plane. The images of the bubble of the spirit-level and the cross-wire are reflected by the reflector R, through the double-convex lens L, to the eye of the observer. Instead of the reflector and double-convex lens other equivalent optical means are employed to effect the same purpose and to give more light, such as a prism and lens, prism with two convex sides, &c.; and instead of the cross-wire a cross-line may be cut on the under side of the spirit-level, &c.

For observations on land, where the instrument may be held with more steadiness than at sea, a small telescope, such as the weakest power usually furnished with the sextant, may be fitted to the eye end of the tube carrying the spirit-level.

The level may be affixed to the sextant or its equivalents by having a tube, C, about one inch in length, with a screw-collar and milled end, M, to screw into the telescope-holder H of the instrument, and then sliding the tube of the spirit-level into it. The adjustment of this level or its equivalent is made either by changing the angle of the reflector or moving the frame carrying the cross-wire, or by elevating one end of the level itself, and consists in making the image of the cross-wire bisect the image of the bubble of the level when a distant object in the same horizontal plane (and seen through the unoccupied half of the tube) appears on a level with the image of the cross-wire. This adjustment is readily effected on land, may be made by means of the level itself, and is not easily deranged.

Should it become necessary to adjust the level at sea, the image of the cross-wire, when it bisects the image of the bubble, is made to appear on the same horizontal line with the visible horizon, and then the connection for dip of the horizon is applied to all observed altitudes and depressions with its proper sign.

Observers with different powers of vision should move the inner tube, carrying the double-convex lens, until the image of the cross-wire appears sharp and well defined when the observer is looking through the tube at a distant object.

The operation in making an observation for the altitude or depression of an object at sea or on land is as follows: Secure the level in its proper place on the instrument, hold the sextant or its equivalent in the usual manner, with the plane of its face in the vertical plane passing through the object and the observer, and look through the tube of the level until the image of the bubble is bisected by the image of the cross-wire; move the vernier-arm until the image of the object is seen through the unoccupied half of the tube, and bring the image of the object into the same horizontal line with the image of the cross-wire, still bisecting the image of the bubble. If the sextant or its equivalent is in adjustment the reading on the arc indicated by the vernier is the observed altitude or depression of the object.

At night observations for altitude or depression of an object may be made by illuminating the level by a lamp or by chemical means.

The index-error may be determined when the level is adjusted on land, and used as a constant quantity for a not extended series of observations; or it may be determined at sea, whenever the horizon is visible, by observing the depression of the horizon and taking the difference or sum of the observed result and the computed dip for the index-error.

Having thus described my improvement, what I claim as my invention, and desire to secure by Letters Patent, is—

The combination of the spirit-level, cross-wire, reflector, and double-convex lens, or their equivalents, with the sextant, quadrant, octant, reflecting-circle, or their equivalents, substantially as above described.

GEORGE DAVIDSON.

Witnesses:
J. E. SHAW,
GEO. BUCKLEY.